Sept. 6, 1955          H. L. SMITH          2,716,938
BASKET FILTER FOR DEEP FAT FRYING APPARATUS
Filed May 8, 1951          2 Sheets-Sheet 1
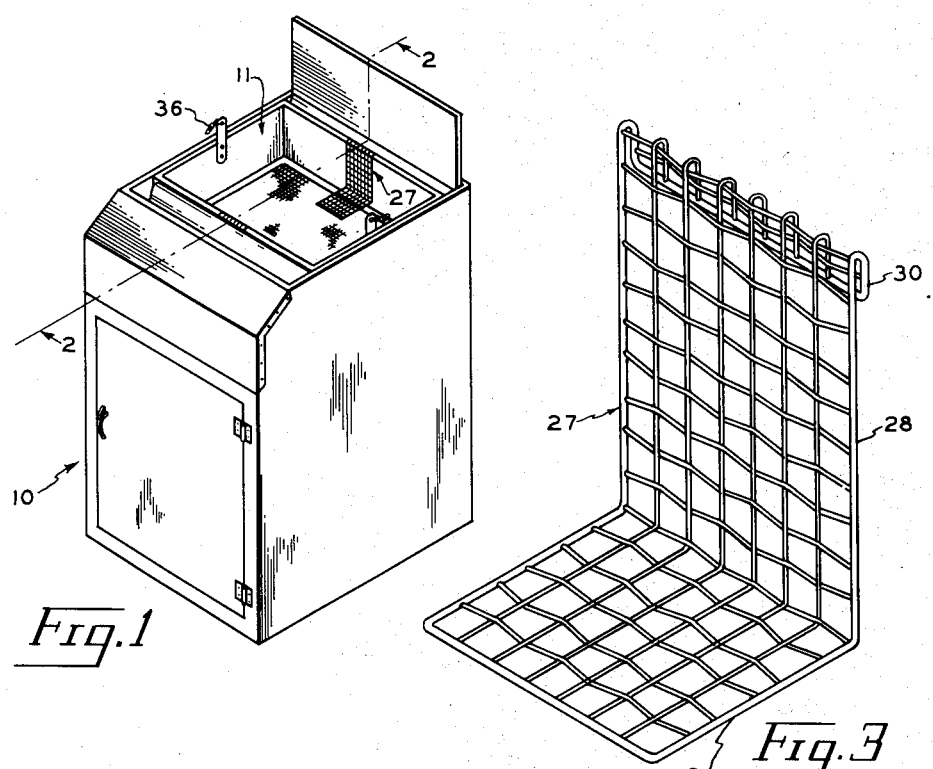
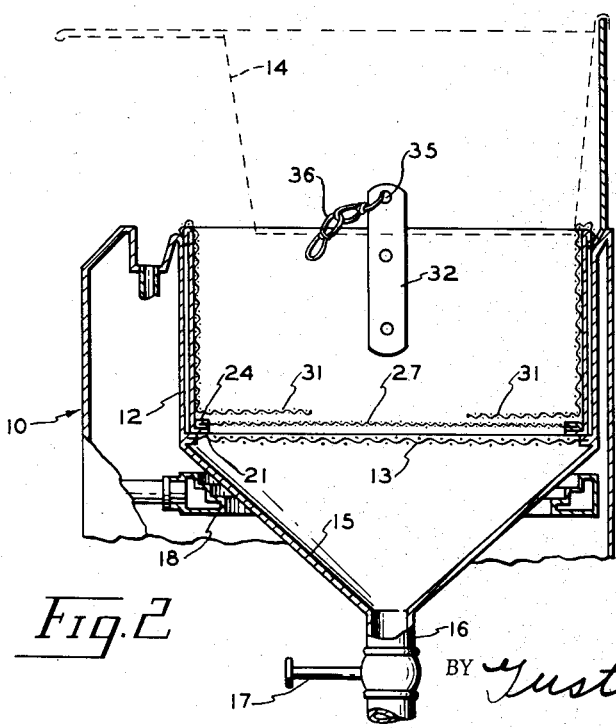
INVENTOR
HARRY L. SMITH
BY *Gustav Miller*
ATTORNEY Sept. 6, 1955 H. L. SMITH 2,716,938
BASKET FILTER FOR DEEP FAT FRYING APPARATUS
Filed May 8, 1951 2 Sheets-Sheet 2

INVENTOR
HARRY L. SMITH

BY *Gustav Miller*
ATTORNEY

United States Patent Office 2,716,938
Patented Sept. 6, 1955

2,716,938
BASKET FILTER FOR DEEP FAT FRYING APPARATUS

Harry L. Smith, Lake Waccamaw, N. C.

Application May 8, 1951, Serial No. 225,208

3 Claims. (Cl. 99—408)

This invention relates to a filter basket for deep fat frying apparatus and has for an object to provide an improved filter basket particularly useful in deep fat frying apparatus, particularly apparatus such as are used the kitchens of restaurants, institutions, and other places wherein food, such as French fried potatoes, chicken, oysters, onions, etc. are fried in deep fat, and it is desired to keep the fat free from contamination by any food particles or materials that drop off the food into the fat and either contaminate the fat per se or are apt to descend through the fat to that part of the apparatus where the heat is applied to the fat, and be broken down by the heat into fat contaminating materials.

A further object of this invention is to provide a means for preventing any food particles or other materials from reaching the heating area of the deep fat frying apparatus, and for so completely filtering the deep fat whenever desired that different types of food can be successfully fried in such deep fat without any taste from one food being carried over and implanted in a successive food if the filter is utilized to strain the fat between the different foods.

A further object of this invention is to provide a basket filter for deep fat frying apparatus which may be made in various sizes, shapes, and dimensions, to fit any existing institutional, commercial, or home kitchen style of deep fat frying apparatus.

A further object of this invention is to provide a basket filter for a deep fat frying apparatus wherein the basket filter is provided with a removable and replaceable element should the original filter element be accidentally damaged through any cause whatsoever.

Still a further object of this invention is to provide a basket filter for deep fat frying apparatus which will prevent any food particles from the food being fried from being descended any deeper into the fat than the bottom of the food basket, thus preventing such food particles from approaching too closely to the heating portion of the apparatus, and preventing a breakdown of the food particles into fat contaminating materials.

Still a further object of this invention is to provide a basket filter for a deep fat frying apparatus which will thoroughly and completely strain all the fat which serves to heat the food in the food basket, as a result of which the life of the fat is extended 150% or more, an important factor when the cost of the frying fat is high, and the fat itself is in short supply.

Yet a further object of this invention is to provide a filter basket for a deep fat frying apparatus wherein the filter basket may be of any suitable metal, such as aluminum, stainless steel, or other materials not apt to be injured by or to contaminate the frying fat or food being fried therein, and wherein the filter element per se is made of suitable material such as copper mesh, which likewise will not contaminate the fat or the food, it being understood of course that the basket itself could likewise be made of the same material as the copper mesh. That is, the basket could be made of sheet copper if desired.

Still a further object of this invention is to provide a basket filter which may be made of a suitable size and shape to fit in any deep fat frying apparatus and be supported therein by the usual food basket supporting grid, and which in turn has attachable food basket supporting elements which will support the food basket spaced slightly above the filter element and the supporting grid, whereby the circulation of the frying fat will not be impeded whatsoever, the supporting element itself being preferably, although not necessarily, of grid construction.

A still further object of this invention is to provide a basket filter which will support and strain out any food particles or the like well above the heating elements of the deep fat frying apparatus, thus making the heating and pre-heating of the cooking fat much more efficient since no waste or broken down food particles are permitted to accumulate on the heating element to insulate the same and interfere with its efficiency.

A further object of this invention is to provide a basket filter for deep fat frying apparatus where all that part of the fat or cooking oil that has ben exposed to and in contact with the food being fried is thoroughly strained by merely temporarily removing the filter basket from the cooking well while the cooking oil has been heated to a high liquid condition.

Yet a further object of this invention is to provide a filter basket for a deep fat frying apparatus wherein the filter basket is provided with integrally secured handles having extending link sections which tend to remain normally cool throughout the cooking process, thus enabling the basket to be readily removed to strain the oil or fat while the cooking continues, then after cleaning the strainer, the strainer basket may be readily replaced.

With the foregoing and other objects in view, this invention comprises the combination, construction and arrangement of parts hereinafter set forth, claimed and disclosed in the accompanying drawings, wherein:

Fig. 1 is an isometric view of a deep fat frying apparatus to which the filter basket of this invention has been added;

Fig. 2 is a sectional view of the upper portion of the frying apparatus showing the filter basket mounted therein;

Fig. 3 is an isometric view of one of the food basket supports;

Figure 4:
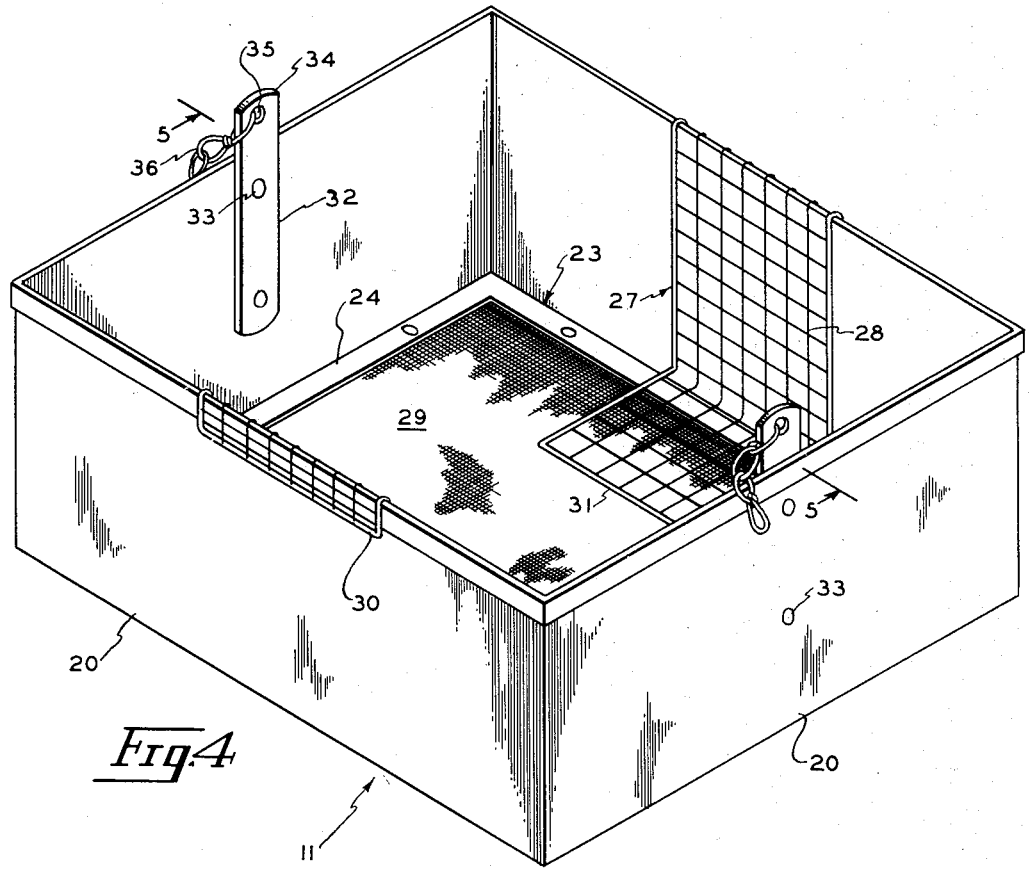
Fig. 4 is an isometric view of the filter basket of this invention.
Figure 5:
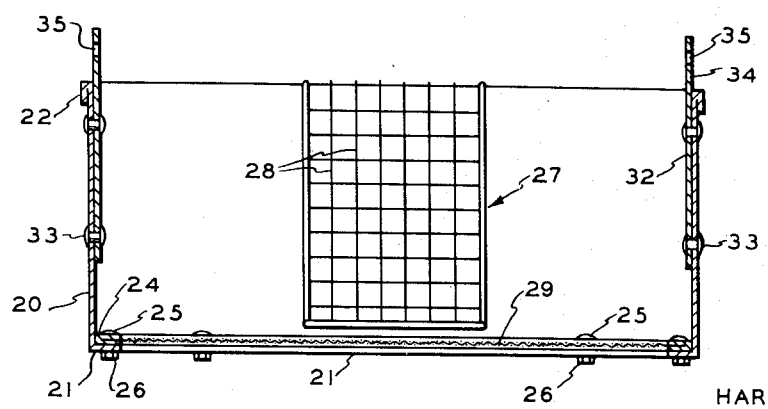
Fig. 5 is a sectional view on line 5—5 of Fig. 4.

There is shown at 10 a deep fat frying apparatus of the style used in commercial, institutional, and industrial kitchens, more details of this particular apparatus being shown in the patent to Pappas 2,528,776 of November 7, 1950. However, this particular deep fat frying apparatus has been shown for illustrative purposes only, and any type or style of deep fat frying apparatus may be used in combination with a filter basket 11 of this invention.

The deep fat frying apparatus as herein illustrated has a fat or cooking oil well 12 which is rectangular in shape, and of suitable depth, being provided at the bottom of its rectangular sides with a food basket supporting grid 13 on which the food frying basket 14 is supported during the deep fat frying process. Below the food basket supporting grid 13 there is provided a sump 15 leading to a drain pipe 16 and control valve 17. Extending about or through the sump 15 is a heating unit 18, here shown as a gas heating unit whose flames contact the sides of the sump 15 substantially below the food basket supporting grid 13, thereby setting up a circulation of heated oil or fat from the sump 15 up through the grid 13 into the food basket 14 and then down again. This circulation normally carries with it any food particles, crumbs, etc. that may be thrown off or dropped off the food in the basket 14, and in the particular apparatus illustrated it is intended or hoped that such food particles will accumulate in the drain pipe 16 to be discarded by opening the valve 17. However, such food particles must pass over and extremely close to the heated portion of the sump 15 and a substantial proportion thereof are broken down or accumulated on the sides of the sump 15 and serve both to contaminate the cooking fat or oil therein as well as to accumulate and insulate the sides of the sump 15, thus interfering with the efficiency of the heating unit 18.

The basket filter of this invention prevents any of the food particles, crumbs, etc. from circulating down into the sump 15. The basket filter 11 of this invention consists of a metal basket having its sides shaped and dimensioned to fit within the deep fat frying apparatus well 12 as shown in Fig. 2. As here shown with the particular illustration, there are four metal sides 20 of a shape and dimension to just fit within the well 12, the bottom of each side 20 having an inturned ledge 21 and at its top has a down-turned reinforcing flange 22, although obviously this reinforcing flange 22 may be omitted if the gauge of the metal or the material of the metal is sufficient to provide strength without the use of this reinforcing flange. The metal of the sides of the basket 11 may be of aluminum, stainless steel, copper or any other suitable metal which will not affect or contaminate the cooking oil or fat or the food being prepared therein.

Arranged to be supported on the inner ledge 21 of the basket 11 is a filter element 23 consisting of a frame member 24 of a size and shape to fit over the ledge 21 and be removably secured thereto by studs 25 permanently or detachably secured through the frame 24 and arranged to extend through appropriately located apertures in the ledge 21 and be secured thereto by removable nuts 26. Permanently secured to the frame 24 by any suitable means is a filter mesh 29 preferably made of copper wire having a mesh of eighty by seventy (80 x 70), commonly known as 80-mesh copper wire, the wire strainer itself having a gauge of 0055. This particular gauge and mesh has been found most suitable for permitting ready circulation of the heated cooking fat or oil therethrough, yet at the same time preventing passage of any food particles, crumbs, or the like therethrough.

The filter basket 11 is dimensioned and shaped so that it will fit within the well 12 of the deep fat frying apparatus 10 and be supported on the supporting grid 13. Two food basket supporting elements 27 are provided and arranged to be detachably secured to the opposite long sides 20 of the filter basket 11. Each of these supporting elements 27 consists of a vertical leg 28 having a hooked end 30 at the top thereof and a horizontally extending supporting foot 31 at the bottom thereof. Although this supporting element 27 could be made of sheet metal with a number of circulatory openings in the foot portion thereof, as here illustrated, the supporting element may be made of a wire mesh of suitable gauge and strength similar, but possibly slightly heavier than the wire mesh used in the food basket 14. The vertical leg 28 will be preferably about one-quarter of an inch shorter than the height of one of the strainer basket sides 20, as a result of which the pair of supporting elements 27 will support the food basket 14 and its contained food about one-quarter of an inch above the wire filter 29, thereby permitting free circulation of the heated cooking fat or oil up through the mesh 29 through the supporting foot 31 and into the food basket 14.

A handle finger 32 is secured as by spot welding, riveting or the like 33, to each of the short sides 20 of filter basket 11, and has an upwardly extending ear 34 provided with an aperture 35 to which is secured several links of a chain 36, the chain 36 thus acting as a handle when it is desired to lift the filter basket from the well 12, or to lower the filter basket 11 into the well 12, while the cooking fat or oil therein is at its maximum temperature. The hook 30 of supporting element 31 is of such size that it will fit very snugly over the upper edge of the side 20 of filter basket 11 whereby it will not interfere with the entry or removal of the filter basket 11 from the well 12.

In operation the food basket 14 is filled with food and placed in the well 12 or removed therefrom while the deep fat frying apparatus 10 is used in its normal manner. However, with this invention, before the food basket 14 is placed in the well 12, the filter basket 11 is lowered into the well 12 being handled by means of the chain 36, either in one's hands or, if necessary, caught in the tongs of a pair of kitchen forks, the basket 11 having the food basket supporting elements 27 in position therein. The cooking oil or fat in the well 12 is first pre-heated to its cooking temperature, and as the filter basket 11 is lowered therein, the cooking oil or fat passes freely through the wire mesh 29. Then the food is placed in the food basket 14 and the food basket 14 placed into the well 12, but within the filter basket 11, and is supported on the supporting feet 31. The cooking is performed in the usual manner, and the basket 14 is removed to remove the cooked food and replaced with a new supply as often as needed. The filter basket 11 is not removed every time a new supply of food is placed in the food basket 14, and it has been found sufficient to remove, clean, and replace the filter basket 20 about once every two hours, particularly as long as the same type of food is being cooked. However, should the type of food be changed, as for instance, a change from frying onions to frying chickens, it is desirable to remove, clean and replace the filter basket between the change-over from one type of food to the next. This insures the removal of all food particles, crumbs, or the like from the cooking oil and prevents any odor or contamination from one type of food being carried over and imparted to the other type of food, and the cooking fat or oil remains uncontaminated by any food particles. In addition, no food particles or crumbs can drop down and lodge on the heating area of the sump 15, hence the particles cannot be broken down either into fat or oil contaminating materials or into an insulating crust over the heating area of the sump. As a result, the cooking fat likewise does not break down so readily and its life is greatly extended as compared to the life of the cooking fat in the same apparatus without the presence of the filter basket of this invention.

While the device has been shown and the structure described in detail, it is obvious that this invention is not to be considered as being limited to the exact form disclosed, and that changes in detail and construction may be made therein within the scope of what is claimed, without departing from the spirit of this invention.

Having thus set forth and disclosed the nature of this invention, what is claimed is:

1. A deep fat frying device comprising an open-topped receptacle having a cooking portion at the upper end thereof and a sump at the lower end thereof, conduit means extending from said sump, heating means externally encompassing said sump adjacent the juncture between said sump and said cooking portion, a screen element positioned within said receptacle between said cooking portion and said sump, and a plurality of oppositely positioned basket-support means mounted within said cooking portion above said screen element, each of said support means being of mesh construction and comprising a vertical section and a horizontal section extending laterally from one end of said vertical section, the opposite end of said vertical section being provided with a hooked portion releasably clamped over an upper edge portion of said receptacle, said horizontal section being vertically spaced from said screen.

2. The device of claim 1 wherein said cooking portion is a container having substantially imperforate side walls, an open top and a screened bottom and wherein said container is separably positioned within said receptacle, and is provided with handle means for lifting it from within said receptacle, and wherein said screen element comprises said screened bottom of said container and a second screen section connected to said sump.

3. The device of claim 1 wherein a housing encompasses said receptacle, said heating means being positioned between said housing and said sump.

References Cited in the file of this patent

UNITED STATES PATENTS

| | | |
|---|---|---|
| 652,283 | Messer | June 26, 1900 |
| 1,396,416 | Garrett | Nov. 8, 1921 |
| 1,428,500 | Buedingen | Sept. 5, 1922 |
| 1,513,488 | Bynum et al. | Oct. 28, 1924 |
| 1,579,874 | Locke | Apr. 6, 1926 |
| 1,931,120 | Shroyer | Oct. 17, 1933 |
| 1,953,291 | De Vry | Apr. 3, 1934 |
| 2,052,476 | Koch | Aug. 25, 1936 |
| 2,061,533 | Anetsberger | Nov. 17, 1936 |
| 2,179,512 | McBirney | Nov. 14, 1939 |
| 2,219,950 | Childs | Oct. 29, 1940 |
| 2,528,776 | Pappas | Nov. 7, 1950 |
| 2,635,527 | Overbeck et al. | Apr. 21, 1953 |